United States Patent
Kameshima et al.

(10) Patent No.: US 7,589,897 B2
(45) Date of Patent: Sep. 15, 2009

(54) ANTIGLARE FILM

(75) Inventors: Hisamitsu Kameshima, Tokyo (JP); Tomo Yoshinari, Tokyo (JP); Kae Takahashi, Tokyo (JP); Yusuke Tochigi, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 12/001,934

(22) Filed: Dec. 12, 2007

(65) Prior Publication Data

US 2008/0316602 A1  Dec. 25, 2008

(30) Foreign Application Priority Data

Jun. 25, 2007 (JP) .............................. 2007-166075

(51) Int. Cl.
*G02B 13/20* (2006.01)
*G02B 5/02* (2006.01)

(52) U.S. Cl. .................. 359/599; 359/601; 428/1.3

(58) Field of Classification Search ................ 359/599, 359/707, 601

See application file for complete search history.

(56) References Cited

U.S. PATENT DOCUMENTS

| | | | |
|---|---|---|---|
| 6,217,176 B1* | 4/2001 | Maekawa | 359/601 |
| 6,710,923 B2* | 3/2004 | Ito | 359/599 |
| 7,525,731 B2* | 4/2009 | Aro et al. | 359/599 |
| 2008/0030861 A1* | 2/2008 | Ookubo et al. | 359/601 |
| 2009/0096972 A1* | 4/2009 | Kameshima | 349/137 |

FOREIGN PATENT DOCUMENTS

| | | |
|---|---|---|
| JP | 06-018706 | 1/1994 |
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

*Primary Examiner*—Thong Nguyen
(74) *Attorney, Agent, or Firm*—Squire, Sanders & Dempsey L.L.P.

(57) ABSTRACT

An antiglare film comprises a transparent substrate; and an antiglare layer on the transparent substrate, the layer including a binder matrix, organic particles A and organic particles B having an average particle diameter smaller than an average particle diameter of particles A, organic particles A and organic particles B dispersed in the binder matrix. An antiglare film having of the present invention can have the following features: good antiglare property; no white blur; high abrasion resistant property; less dazzling; and not whitened.

3 Claims, 4 Drawing Sheets

ANTIGLARE FILM

CROSS REFERENCE

This application claims priority to Japanese application number 2007-166075, filed on Jun. 25, 2007, which is incorporated by reference.

BACKGROUND OF THE INVENTION

1. Field of the Invention

The present invention relates to an antiglare film to be provided on the surface of a window, display etc. In particular, it relates to an antiglare film to be provided on the front surface of display such as a liquid crystal display (LCD), cathode-ray tube (CRT) display, plasma display (PDP), organic electroluminescence display (ELD) and field effect display (FED, SED).

2. Description of the Related Art

It is well known that an antiglare film having concaves and convexes structure (rugged structure) on its surface is provided on a front surface of a display in order to reduce the degradation of visibility due to reflection of external light when viewing a display such as a liquid crystal display, a CRT display, an EL display and a plasma display.

As to an antiglare film, for example, the following technologies are known:

a technology which creates a rugged structure in a surface of an antiglare film by embossing; and a technology which creates a rugged structure in a surface of an antiglare film by a binder matrix with particles dispersed therein, wherein a coating liquid in which a binder matrix-forming material is mixed with particles is coated.

In an antiglare film whose surface have a rugged structure is obtained by the above mentioned technology, an external light incident on an antiglare film scatters because of the rugged structure, thereby an image obtained by an external light becomes unclear. Therefore, it becomes possible to control degradation of visibility due to reflection of external light in a front surface of a display.

In an antiglare film on the surface of which is formed irregularity through an embossing finish, the surface irregularity thereof can be completely controlled. Consequently, reproducibility is good. However, when there is a defect or an adhered foreign substance on an emboss roll, endless defects occur at the pitch of roll.

On the other hand, the number of processes in the manufacturing of an antiglare film using a binder matrix and particles is smaller than that in the manufacturing of an antiglare film using embossing. Therefore the manufacturing cost of an antiglare film using a binder matrix and particles is lower. Various embodiments of an antiglare film using a binder matrix with particles dispersed therein are known. (Patent Document 1)

As for an antiglare film using a binder matrix and particles, various technologies are disclosed, for example, the following techniques are disclosed.

A technique in which a binder matrix resin, spherical particles and amorphous particles are used in combination (Patent Document 2).

A technique in which a binder matrix resin and plural particles having different particle sizes are used (Patent Document 3).

A technique including surface irregularity, wherein the cross-sectional area of the concave portion is defined (Patent Document 4).

In addition, the following techniques are disclosed.

A technique wherein internal haze (cloudiness) is 1-15% and surface haze (cloudiness) is 7-30% by using internal scattering and surface scattering in combination. (Patent Document 5)

A technique wherein, while using binder resin and particles having the particle size of 0.5-5 μm, the difference in refraction indices of the resin and the particle is 0.02-0.2 (Patent Document 6).

A technique wherein, while using binder resin and particles having the particle size of 1-5 μm, the difference in refraction indices of the resin and the particle is 0.05-0.15. Further, there are techniques defining a solvent to be used and surface roughness etc. (Patent Document 7).

A technique wherein, using binder resin and plural types of particles, the difference in refraction indices of the resin and the particle is 0.03-0.2 (Patent Document 8).

The following techniques are also known that reduce the lowering of contrast, hue variation etc. when a viewing angle is altered. In the technique, the surface haze (cloudiness) is 3 or more. Further, the difference between the haze value in the direction of normal line and the haze value in the direction of ±60° is 4 or less (Patent Document 9).

As described above, there are disclosed antiglare films with various constituents for various purposes.

The performance required for an antiglare film differs depending on the displays when it is used on the front face of a display. For example, the optimum antiglare film differs depending on the resolving power of a display, intended purpose etc. A broad range of antiglare films are required according to the intended purposes.

[Patent Document 1] JP-A-6-18706
[Patent Document 2] JP-A-2003-260748
[Patent Document 3] JP-A-2004-004777
[Patent Document 4] JP-A-2003-004903
[Patent Document 5] JP-A-11-305010
[Patent Document 6] JP-A-11-326608
[Patent Document 7] JP-A-2000-338310
[Patent Document 8] JP-A-2000-180611
[Patent Document 9] JP-A-11-160505

SUMMARY OF THE INVENTION

In an antiglare film, the following features are needed: (1) a surface on an antiglare layer has good an antiglare property and in a case where external light is reflected, the external light image is unclear; (2) in a case where a fluorescent tube light is reflected on a surface of an antiglare layer, a phenomenon in which an antiglare film discolors almost does not occur; (4) a surface of an antiglare layer has an abrasion resistant property; and (5) an antiglare film is not whitened.

BRIEF DESCRIPTION OF DRAWINGS

FIGS. 3(a) and (b) are each a transmission type liquid crystal display with the use of each illustrated embodiment of an antiglare film of the present invention.

In these drawings, 1 is an antiglare film; 1' is an antiglare film; 11 is a base material (substrate); 12 is an antiglare layer; 120 is a binder matrix; 12A is organic particle A; 12B is organic particle B; $R_A$ is an average particle diameter of organic particles A; $R_B$ is an average particle diameter of organic particles B; H is an average film thickness of an antiglare layer; 13 is a functional layer; 2 is a polarizing plate; 21 is a base material (substrate); 22 is a base material (substrate); 23 is a polarizing layer; 3 is a liquid crystal cell; 41 is a base material (substrate); 42 is a base material (substrate); 5 is a backlight unit; 30 is a die head; 31 is a piping; 32 is a tank for a coating liquid; 33 is a liquid supplying pump; and 35 is a rotary roll.

DESCRIPTION OF THE PREFERRED EMBODIMENTS

Figure 1:
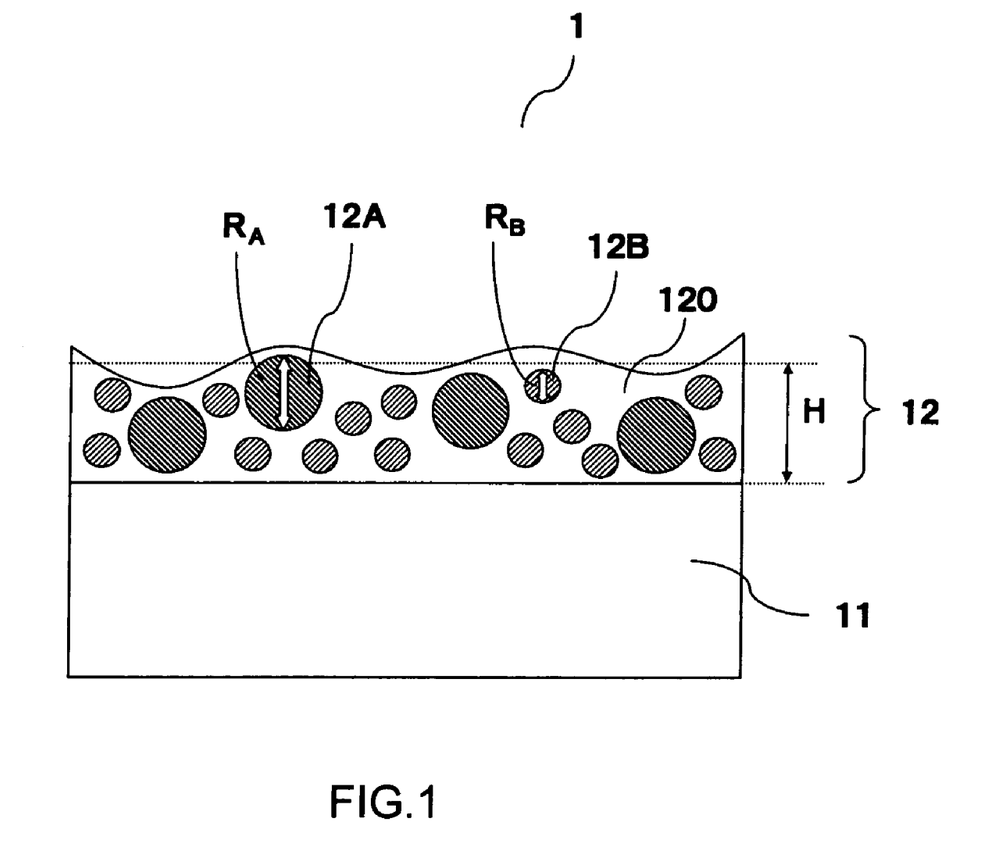
FIG. 1 is a cross section view of an embodiment of an antiglare film of the present invention.

FIG. 1 shows a cross sectional view of an embodiment of an antiglare film of the present invention. As for an antiglare film (1) of the present invention, the antiglare layer (12) is formed on a transparent substrate (11). The antiglare layer (12) of the antiglare film (1) of the present invention includes a binder matrix (120) and organic particles A (12A) and organic particles B (12B) having an average particle diameter smaller than an average particle diameter of organic particles A (12A).

The present invention has the following features:

(a) a value ($R_A/H$), which is an average particle diameter ($R_A$) of organic particles A divided by an average film thickness (H) of an antiglare layer, is equal to or more than 0.40 and equal to or less than 0.80;

(b) a value ($R_B/R_A$), which is an average particle diameter ($R_B$) of organic particles B divided by an average particle diameter ($R_A$) of organic particles A, is equal to or more than 0.20 and equal to or less than 0.60;

(c) a value (($W_A+W_B$)/$W_M$), which is the total of the content ($W_A$) of organic particles A and the content ($W_B$) of organic particles B in an antiglare layer divided by the content ($W_M$) of a binder matrix in an antiglare layer, is equal to or more than 0.10 and equal to or less than 0.40;

(d) a value ($W_B/W_A$), which is the content ($W_B$) of organic particles B in an antiglare layer divided by the content ($W_A$) of organic particles A in an antiglare layer, is equal to or more than 0.50 and equal to or less than 1.50;

(e) the difference in refractive index ($|n_A-n_M|$) between the refractive index ($n_A$) of organic particles A and the refractive index ($n_M$) of a binder matrix is equal to or more than 0.02 and equal to or less than 0.05, and the difference in refractive index ($|n_B-n_M|$) between the refractive index ($n_B$) of organic particles B and the refractive index ($n_M$) of a binder matrix is equal to or more than 0.02 and equal to or less than 0.05; and (f) the difference in refractive index ($|n_A-n_B|$) between the refractive index ($n_A$) of organic particles A and the refractive index ($n_B$) of organic particles B is equal to or less than 0.01.

In the present invention, (a) a value ($R_A/H$) which is an average particle diameter ($R_A$) of organic particles A divided by an average film thickness (H) of an antiglare layer is equal to or more than 0.40 and equal to or less than 0.80. In a case where a value ($R_A/H$) is less than 0.40, it becomes difficult to form concaves and convexes on a front surface of an antiglare layer, thereby the antiglare property is lowered and the reflection of external light can not be controlled sufficiently. On the other hand, in a case where a value ($R_A/H$) is more than 0.80, too big convexes are formed in a front surface of an antiglare layer, that is, concaves and convexes in a front surface of an antiglare layer becomes too much, thereby white blur occurs when an external light is reflected. Further, too big convexes are easily chipped off, therefore abrasion resistant property is lowered.

In addition, the average film thickness (H) of an antiglare layer means the average value of film thickness of the antiglare layer whose surface has concaves and convexes. The average value of film thickness can be found by using an electronic micrometer and a fully automatic machine for measuring fine shape. In addition, the average particle diameter of organic particles A used for the present invention can be measured by a method for measuring a particle diameter distribution based on light scattering.

Further, in the present invention, a value ($R_B/R_A$), which is an average particle diameter ($R_B$) of organic particles B divided by an average particle diameter ($R_A$) of organic particles A, is equal to or more than 0.20 and equal to or less than 0.60. In a case where $R_B/R_A$ is more than 0.60, the concaves and convexes structure of a surface, formed by organic particles A and organic particles B, is excess (that is, the difference in height between concaves and convexes is too big), thereby white blur occurs and the abrasion resistant property is lowered. On the other hand, in a case where $R_B/R_A$ is less than 0.20, organic particles A and organic particles B aggregate as one, thereby excess concaves and convexes are formed on a surface. That is, organic particles B are put between plural organic particles A near a particle B, thereby it becomes difficult to prevent organic particles from aggregating. Therefore, the concaves and convexes structure of a surface, formed by organic particles A, becomes excess, and white blur occurs and the abrasion resistant property is lowered. In addition, an average particle diameter of organic particles B as well as an average particle diameter of particles A can be measured by an apparatus for measuring particle diameter distribution based on light scattering.

Further, in the present invention, a value (($W_A+W_B$)/$W_M$), which is the total of the content ($W_A$) of organic particles A and the content ($W_B$) of organic particles B in an antiglare layer is divided by the content ($W_M$) of a binder matrix in an antiglare layer, is equal to or more than 0.10 and equal to or less than 0.40. In a case where ($W_A+W_B$)/$W_M$ is more than 0.40, the concave and convex structure of a surface formed by organic particles A and organic particles B becomes excess, therefore white blur occurs and the abrasion resistant property is lowered. In addition, in a case where ($W_A+W_B$)/$W_M$ is less than 0.10, it becomes difficult to form concaves and convexes on a surface of an antiglare layer, thereby the antiglare property is lowered and the reflection of an external light can not be controlled sufficiently. In addition, in the present invention, the content ($W_M$) of a binder matrix in an antiglare layer means the weight value of the antiglare layer without the weight of organic particles A and the weight of organic particles B.

In addition, in the present invention, a value ($W_B/W_A$) which is the content ($W_B$) of organic particles B in an antiglare layer divided by the content ($W_A$) of organic particles A in an antiglare layer is equal to or more than 0.50 and equal to or less than 1.50. In the present invention, by using organic particles A and organic particles B having the above features (a), (b) and (c), and setting $W_B/W_A$ at 0.5-1.5, organic particles B are placed between adjacent organic particles A, thereby it becomes possible to disperse organic particles A uniformly without organic particles A aggregating in an antiglare layer. Therefore, an antiglare film having high an abrasion resistant property without white blur can be obtained. In a case where $W_B/W_A$ is less than 0.50, organic particles A can not be uniformly dispersed in an antiglare layer by placing organic particles B between adjacent organic particles A. Therefore the concaves and convexes of a surface formed by organic particles A and organic particles B become excess, thereby white blur occurs and the abrasion resistant property is lowered. In a case where $W_B/W_A$ is more than 1.50, the dispersion of organic particles A is prevented, however organic particles B aggregate, therefore the concaves and convexes of a surface formed by organic particles A and organic particles B become excess, thereby white blur occurs and the abrasion resistant property is lowered.

In an antiglare film having concaves and convexes on the film's surface, by enlarging convexes to be formed on a surface, a good antiglare property can be achieved, wherein an image to be obtained by an external light is unclear when an external light is reflected. However, in a case where the concaves and convexes in a surface of an antiglare layer become excess, the phenomenon of discoloring (fading) of the entire display, called as "white blur", occurs when light from a fluorescent tube or the like reflects. White blur occurs when light from a fluorescent tube or the like incident to a surface of an antiglare layer scatters too much due to excess concaves and convexes formed in a surface of an antiglare layer.

In an antiglare film including an antiglare layer having too big concaves and convexes on the surface, convexes are easily chipped off when a surface of an antiglare film is rubbed. Therefore, a trace which is formed by chipping convexes off when an antiglare film is rubbed is easily visible, that is, an antiglare film has a low abrasion resistant property.

In an antiglare film in which concaves and convexes are formed on a surface of an antiglare layer by dispersing particles in a binder matrix, if the average particle diameter of particles to be used is large, convexes to be formed on an antiglare layer tend to be large. On the other hand, even if the average particle diameter of particles to be used is small, too big concaves and convexes are formed on a surface of an antiglare layer by particles dispersed nonuniformly in an antiglare layer, that is, particles aggregate.

The inventors found that if the antiglare layer is formed using organic particles A and organic particles B having an average particle diameter less than the average particle diameter of organic particles A, thereby an organic particles B are put between two organic particles A, and thereby organic particles A can be uniformly dispersed in an antiglare layer and an antiglare film having a high abrasion resistant property without discoloring can be obtained.

In other words, in the present invention, organic particles defined as (a) are used. Organic particles B defined as (b) are used. The total content of organic particles A and organic particles B defined as (c) is used. The content of organic particle B defined as (d) is used. In an antiglare film having an antiglare layer satisfying conditions (a), (b), (c) and (d), an organic particles B are placed between organic particles A in an antiglare layer, therefore organic particles A are uniformly dispersed and an antiglare film having a high abrasion resistant property and good antiglare property without white blur can be obtained.

Further, in the present invention, (e) the difference in refractive index ($|n_A-n_M|$) between the refractive index ($n_A$) of organic particles A and the refractive index ($n_M$) of a binder matrix is equal to or more than 0.02 and equal to or less than 0.05, and the difference in refractive index ($|n_B-n_M|$) between the refractive index ($n_B$) of organic particles B and the refractive index ($n_M$) of a binder matrix is equal to or more than 0.02 and equal to or less than 0.05. In a case where the difference in refractive index ($|n_A-n_M|$) and the difference in refractive index ($|n_B-n_M|$) are less than 0.02, the light transmitted through an antiglare layer does not scatter sufficiently and the degree of dazzling which is a phenomenon that a displayed image glitters becomes too big. On the other hand, in a case where the difference in refractive index ($|n_A-n_M|$) and the difference in refractive index ($|n_B-n_M|$) are more than 0.05, light scattering inside an antiglare layer becomes too great, therefore an antiglare film is whitened.

In addition, the refractive index ($n_M$) of a binder matrix means the refractive index of a film, wherein the film is formed by using a binder matrix. In a case where an ionizing radiation-curable type binder matrix-forming material is used, the refractive index ($n_M$) of a binder matrix means the refractive index of a binder matrix cured by ionizing radiation. That is, the refractive index of a binder matrix is the refractive index of a part of an antiglare layer, which part is without organic particles A and organic particles B. In addition, the refractive index ($n_M$) of a binder matrix and the refractive indexes ($n_A$, $n_B$) of organic particles A and organic particles B can be measured according to the Becke line-detecting method (the immersion method).

In addition, in the present invention, (f) the difference in refractive index ($|n_A-n_B|$) between the refractive index ($n_A$) of organic particles A and the refractive index ($n_B$) of organic particles B is equal to or less than 0.01. In a case where $|n_A-n_B|$ is more than 0.01, unevenness in diffusing light in small areas occurs, thereby the degree of dazzling becomes large. That is, the light diffusing level caused by the difference in refractive index between organic particles A and a binder matrix is different from the light diffusing level caused by the difference in refractive index between organic particles B and a binder matrix. Therefore, in a case where an image is displayed, a phenomenon (dazzling) in which a displayed image glitters becomes significant. In addition, in the present invention, organic particles A and organic particles B may comprise the same material and the difference in refractive index ($|n_A-n_B|$) may be 0.

The inventors of the present invention found that a phenomenon (dazzling) where when an image is displayed in a display with an antiglare film, a displayed image glitters can disappear by scattering sufficiently the light transmitted through an antiglare layer because of the difference in the refractive index between a particle and a binder matrix. That is, the inventors found that, in a case where the difference in refractive index ($|n_A-n_M|$) and the difference in refractive index ($|n_B-n_M|$) are less than 0.02, the light transmitted through an antiglare layer does not scatter sufficiently, thereby the degree of dazzling becomes large. Inventors further found that, in a case where the difference in refractive index ($|n_A-n_B|$) is more than 0.01, the degree of dazzling becomes large since the light diffusing in a small area becomes uneven. In addition, inventors found that an antiglare film is not whitened by setting the differences in refractive indexes ($|n_A-n_M|$, $|n_B-n_M|$) at 0.05 or less.

In addition, in the present invention, it is desirable that the average film thickness (H) of an antiglare layer is 3-30 μm. In a case where the average film thickness of an antiglare layer is less than 3 μm, an antiglare film may not be obtained, wherein the antiglare film is too hard to be arranged on a front surface of a display. On the other hand, in a case where the average film thickness is more than 30 μm, the manufacturing cost is too high, and the antiglare film may not be suitable for the process by which the antiglare film is arranged on a front surface of a display since the degree of curl of the antiglare film is too big. Further, more preferably, the average film thickness of an antiglare layer is 4-20 μm.

In addition, an antiglare film can have a functional layer having, for example, reflection preventing performance, antistatic performance, antifouling performance, electromagnetic shield performance, infrared absorbing performance, ultraviolet absorbing performance and color correcting performance. Examples of these functional layers include a reflection preventing layer, an antistatic layer, an antifouling layer, an electromagnetic shield layer, an infrared absorbing layer, an ultraviolet absorbing layer, a color correcting layer and the like. In addition, these functional layers may consist of one layer or a plural of layers. One embodiment of the functional layer is that a functional layer having one layer has a plural of functions. For example, a reflection preventing layer having antifouling performance can be adopted. These functional layers may be provided between a transparent substrate and an antiglare layer, or may be provided on an antiglare layer. In addition, to improve the adhesion property between two layers, a primer layer, an adhesion layer and the like can be provided between the layers.

Figure 2:
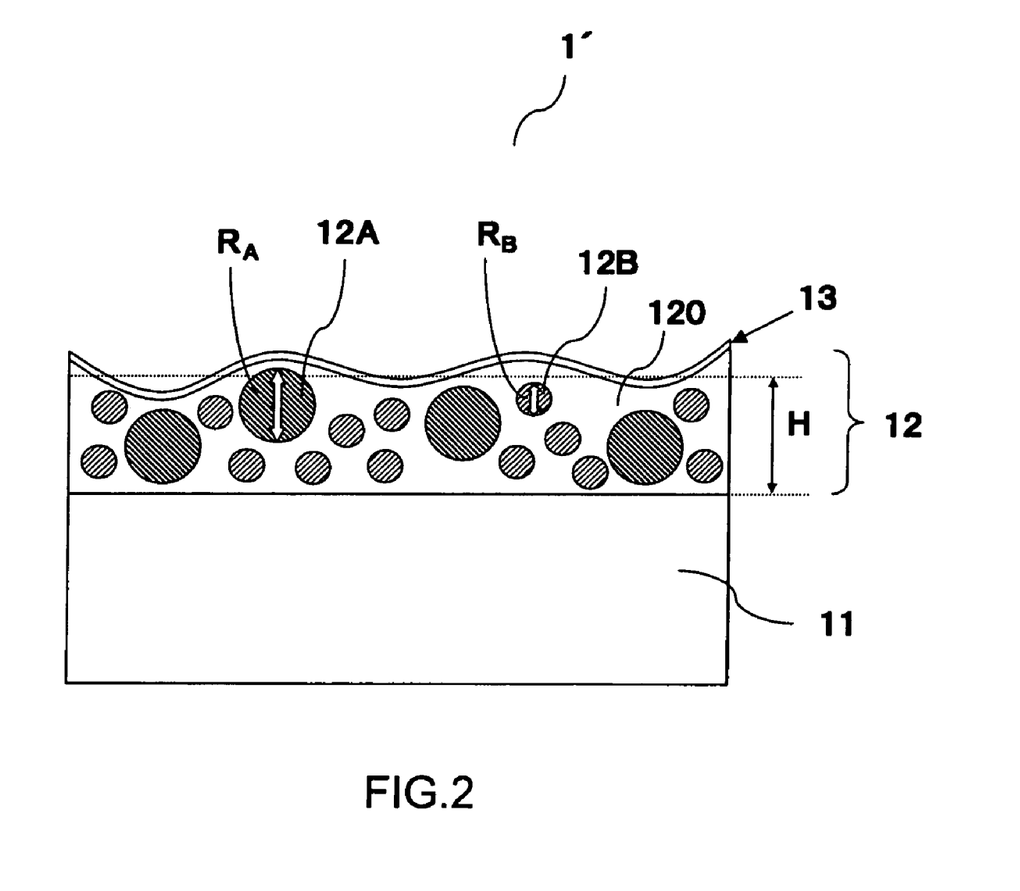
FIG. 2 is a cross section view of another embodiment of an antiglare film of the present invention.

FIG. 2 shows a cross section view of another embodiment of an antiglare film of the present invention. This embodiment of the antiglare film (1') comprises an antiglare layer (12) on a transparent substrate (11) and a functional layer (13) on an antiglare layer (12). A functional layer is preferably selected from an antistatic layer, a reflection preventing layer and an antifouling layer. Among them, a reflection preventing layer is preferably provided on an antiglare layer. When a reflection preventing layer is formed on an antiglare layer, the reflection on a surface of an antiglare layer of external light can be further lowered. When a reflection preventing layer is formed on an antiglare layer, the reflection of external light is controlled by light, incident to an antiglare film, scattering at concaves and convexes of a surface of an antiglare layer, and by interference of the light at a reflection preventing layer.

Here, in a case where a functional layer is provided on an antiglare layer, an acrylic additive can be preferably used at the time when an antiglare layer is formed by applying a coating liquid, including a binder matrix-forming material, organic particles A and organic particles B, to a transparent substrate. In a case where an antiglare film is formed by applying a coating liquid to a transparent substrate, an additive called a surfactant is added to a coating liquid in order to apply a coating liquid uniformly to a transparent substrate and in order to prevent a defective surface having repelling, bubble, pinhole and crater from occurring in an antiglare layer which is formed by applying a coating liquid. A surfactant (a surface conditioner) is called a leveling agent, antifoaming agent, boundary tension regulator, regulator of surface tension according to its function. All of them have the function of lowering surface tension of a coating liquid.

Silicone system additives, fluorine system additives and acrylic additives can be used as a surfactant. Here, if silicone system additives or fluorine system additives are used as a surfactant, a defective coated film having repelling, unevenness or the like disappears while a problem occurs that the adhesive property between an antiglare layer and a functional layer is lowered when a functional layer is formed on an antiglare layer. Further, a functional layer is easily peeled off when a surface of an antiglare film is rubbed when an adhesive property at an interface between an antiglare layer and a functional layer is lowered, thereby a problem of low abrasion resistant property occurs. On the other hand, when acrylic additives are used, a problem that the abrasion resistant property is lowered by the low adhesive property between an antiglare layer and a functional layer does not easily occur.

In other words, when a functional layer is further formed on an antiglare layer, an acrylic additive as a surfactant can be preferably used for a coating liquid to form an antiglare layer. Using an acrylic additive as a surfactant, an antiglare film having high abrasion resistant property without lower adhesive property between an antiglare layer and an antifouling layer formed thereon can be obtained.

Examples of functional layers formed on an antiglare layer include an antistatic layer, a reflection preventing layer and an antifouling layer. A functional layer may consist of a single layer or may consist of plural layers. A functional layer may consist of a single layer having plural functions. For example, an antifouling layer has a reflection preventing performance. A reflection preventing layer may be a single layer consisting of a low refractive index layer or may consist of plural layers where a low refractive index layer and a high refractive index layer are laminated repeatedly.

Figure 3:
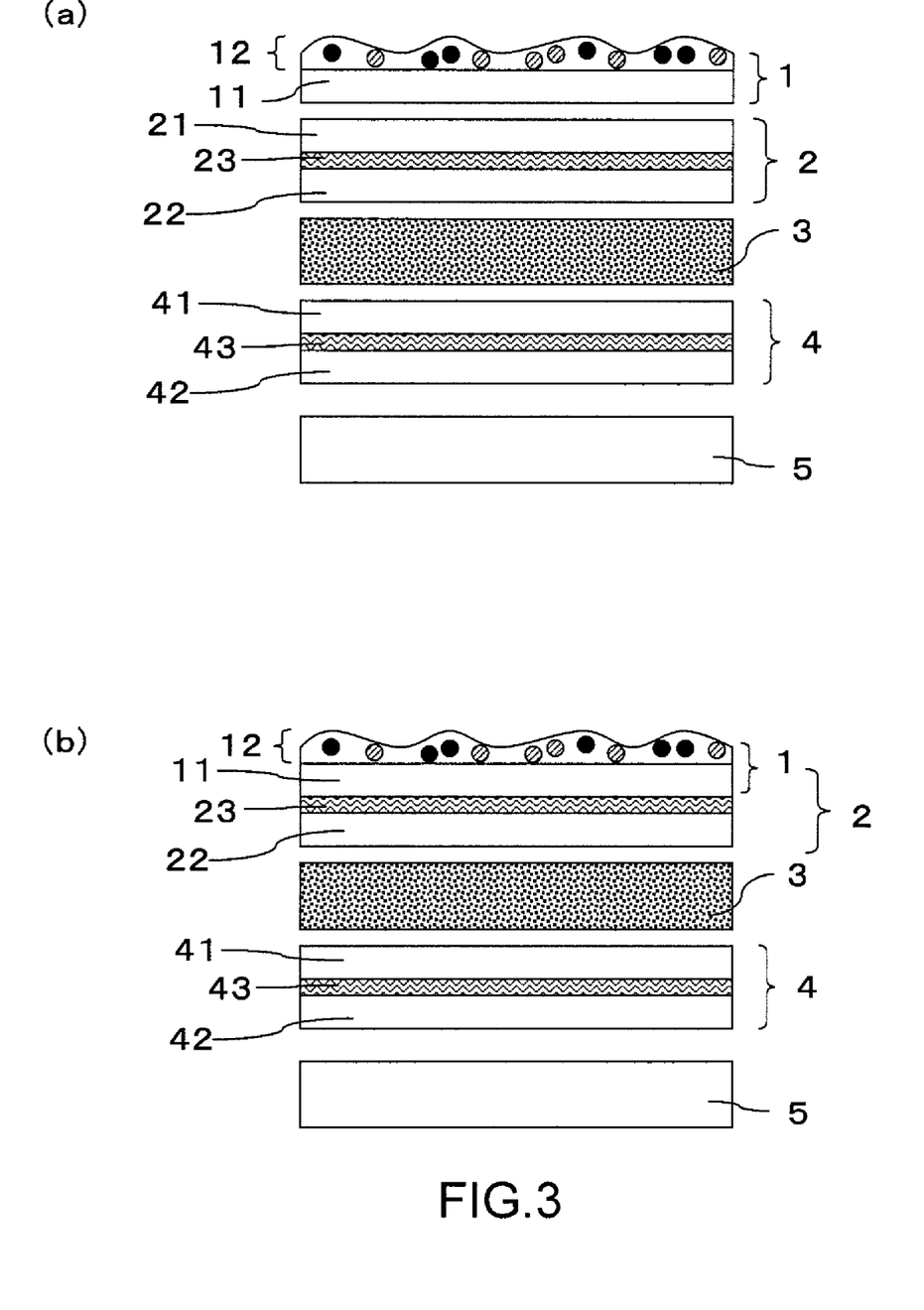

FIG. 3 is a cross-sectional view showing a transmission type liquid crystal display with an antiglare film of the present invention. A transmission type liquid crystal display shown in FIG. 3(a) has a backlight unit (5), a polarization plate (4), a liquid crystal cell (3), a polarization plate (2) and an antiglare film (1) in this order. In this embodiment, an antiglare film side is an observer side, that is, a front surface of a display.

A backlight unit (5) comprises a light source and a light diffusing plate. As for a liquid crystal cell, an electrode is provided on a transparent base material in one side, an electrode and a color filter are provided on a transparent base material in another side and a liquid crystal is encapsulated between the electrodes. As for polarization plates sandwiching a liquid crystal cell (3), polarization layers (23, 43) are between transparent base materials (21, 22, 41 and 42).

In FIG. 3(a), a transmission type liquid crystal display comprises an independently transparent substrate (11) of an antiglare film (1) and a transparent substrate of a polarizing plate (2). On the other hand, in FIG. 3(b), a polarizing layer (23) is formed on a surface of a transparent substrate (11), wherein an antiglare layer is formed on another surface of a transparent substrate (11). That is, a transparent substrate (11) is a transparent substrate of an antiglare film and is a transparent substrate of a polarizing plate (2).

In addition, a transmission type liquid crystal display of the present invention can have other functional members. Examples of other functional members include a diffusing film, a prism sheet and a luminance improving film for using light emitted from a backlight effectively, and a phase difference film for compensating the phase difference of a liquid crystal cell or a polarizing plate. A transmission type liquid crystal display of the present invention is not limited to these embodiments.

Hereinafter, a method of manufacturing an antiglare film of the present invention is described.

An antiglare film can be manufactured by the following steps: a coated film is formed on a transparent substrate by applying a coating liquid for forming an antiglare layer including a binder matrix-forming material, organic particles A and organic particles B, wherein a binder matrix-forming material is an ionizing radiation-curable material; and a binder matrix-forming material is cured by ionizing radiation.

As the substrate for use in the antiglare film of the invention, a glass plate, a plastic film etc. can be used. It suffices that the plastic film has a proper degree of transparency and mechanical strength. For example, films made of polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used. Among them, a triacetylcellulose film is preferably used since the double refraction in a triacetylcellulose film is small and the transparency of a triacetylcellulose film is high. Especially, when an antiglare film of the present invention is used for a front surface of a liquid crystal display, it is desirable that a triacetylcellulose film is used as a transparent substrate.

In addition, as shown in FIG. 3(b), a polarizing layer can be formed on a surface of a transparent substrate, wherein an antiglare layer is formed on another surface of a transparent substrate. In this case, examples of polarizing layers include a stretched polyvinyl alcohol (PVA) with iodine added thereto. In this case, a polarizing layer is sandwiched transparent substrates.

A coating liquid for forming an antiglare layer includes a binder matrix-forming material, organic particles A and organic particles B, wherein a binder matrix-forming material is an ionizing radiation-curable material. In this case, as a binder matrix-forming material, an ionizing radiation-curable material can be used. Examples of the ionizing radiation-curable materials include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

It is desirable that, among them, a trifunctional acrylic monomer and a tetrafunctional acrylic monomer which are ionizing radiation-curable materials are used as a binder matrix-forming material. The usage of a trifunctional acrylic monomer and a tetrafunctional acrylic monomer produces an antiglare film having enough abrasion resistant property. Examples of trifunctional acrylic monomers and tetrafunctional acrylic monomers include trifunctional and tetrafunctional materials among polyfunctional acrylate monomers such as acrylic or methacrylic ester of polyhydric alcohol, and polyfunctional urethane acrylate monomer synthesized from diisocyanate, polyhydric alcohol and hydroxyl ester of acrylic acid or methacrylic acid. As for these examples, it is desirable that "a trifunctional acrylic monomer and a tetrafunctional acrylic monomer" of 80 wt % or more based on a binder matrix-forming material is used.

In addition, a binder matrix-forming material can include a thermoplastic resin and the like besides an ionizing radiation-curable material.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

The adding of a thermoplastic resin to a binder matrix-forming material can allow an adhesive property between a transparent material and an antiglare layer to be improved. Further, the adding of a thermoplastic resin to a binder matrix-forming material can allow curl of an antiglare film to be controlled.

Organic particles A and organic particles B to be used for the present invention include acryl particles (refractive index 1.49), acryl styrene particles (refractive index 1.49-1.59), polystyrene particles (refractive index 1.59), polycarbonate particles (refractive index 1.58), melamine particles (refractive index 1.66), epoxy particles (refractive index 1.58), polyurethane particles (refractive index 1.55), nylon particles (refractive index 1.50), polyethylen particles (1.50-1.56), polypropylene particles (refractive index 1.49), silicone particles (refractive index 1.43), polytetrafluoroethylene particles (refractive index 1.35), polyvinylidene fluoride particles (refractive index 1.42), polyvinyl chloride particles (refractive index 1.54) and polyvinylidene chloride particles (refractive index 1.62). In addition, organic particles A and organic particles B may be made from the same material.

In the present invention, the usage of an organic particle comprising an organic material as a particle included in an antiglare layer can allow an antiglare film to be highly transparent and can allow the adjustment of the refractive index of a particle to be easy.

When an ultraviolet ray-curable material among the ionizing radiation-curable materials is used, a photopolymerization initiator is added to a coating liquid. A known photopolymerization initiator can be used, but the use of one suitable for a binder matrix-forming material to be used is preferred. As the photopolymerization initiator, benzoin such as benzoin, benzoinmethylether, benzoinethylether, benzoinisopropylether and benzylmethylketal and alkyl ethers thereof are used. The use amount of the photosensitizing agent is 0.5-20 wt %, preferably 1-5 wt % relative to the binder matrix-forming material.

A solvent is added to a coating liquid if necessary. The inclusion of a solvent can permit a particle or a binder matrix to scatter uniformly and can permit the viscosity of a coating liquid to be adjusted to a desired range in a case where a coating liquid is applied to a transparent substrate.

In the present invention, when a triacetylcellulose film is used as a transparent substrate and an antiglare layer is directly formed on a triacetylcellulose film, it is desirable that a mixed solvent including both one kind of solvent and another kind of solvent, wherein the one kind of solvent dissolves or swells a triacetylcellulose film and the another kind of solvent does not dissolve or swell a triacetylcellulose film, is used as a solvent for a coating liquid to form an antiglare layer. The use of the mixed solvent permits an antiglare film to have enough adhering strength at an interface between a triacetylcellulose film and an antiglare layer.

As a solvent which dissolves or swells a triacetylcellulose film, ether such as dibutyl ether, dimethoxymethane, dimethoxyethane, diethoxyethane, propylene oxide, dioxan, dioxolane, trioxane, tetrahydrofuran, anisole and phenetole, or some ketones such as acetone, methyl ethyl ketone, diethyl ketone, dipropyl ketone, di-isobutyl ketone, cyclopentanone, cyclohexanone, methylcyclohexanone and methylcyclohexanone, or Ester such as ethyl formate, propyl formate, formic acid n-pentyl, methyl acetate, ethyl acetate, methyl propionate, ethyl propanoate, acetic acid n-pentyl and γ-butyrolactone, or Cellosolve such as methyl cellosolve, cellosolve, butylcellosolve and Cellosolve acetate can be used. As for these materials, one kind of a material can be used alone and two or more kinds of materials which are mixed can be used.

As a solvent which does not dissolve or swell a triacetylcellulose film, aromatic hydrocarbons such as toluene, xylene, cyclohexane and cyclohexylbenzene, or hydrocarbon such as n-hexane, or some ketones such as methyl isobutyl ketone and methyl butyl ketone can be used. As for these materials, one kind of a material can be used alone and two or more kinds of materials which are mixed can be used.

In the present invention, an additive called a surfactant can be added to a coating liquid to form an antiglare layer in order to prevent a defective coated film having repelling, unevenness or the like from occurring. A surfactant is called a leveling agent, an antifoaming agent, boundary tension regulator, regulator of surface tension according to its function. All of them have the function of lowering surface tension of a coating liquid.

Silicone system additives, fluorine system additives and acrylic additives can be used as a surfactant. A silicone system additive includes a derivative having a basic structure of dimethylpolysiloxane, for example, a material which the side-chain of dimethylpolysiloxane structure is denatured. For example, polyether-modified dimethylsiloxane is used as a silicone system additive. In addition, as a fluorine system additive, a compound having a perfluoroalkyl group is used.

However, if silicone system additives or fluorine system additives are used as a surfactant, a defective coated film having repelling, unevenness or the like disappear while such a problem occurs that the adhesive property between an antiglare layer and a functional layer is lowered when a functional layer is formed on an antiglare layer. Further, a functional layer is easily peeled off when a surface of an antiglare film is rubbed in a case where an adhesive property at an interface between an antiglare layer and a functional layer is lowered, thereby a problem of low abrasion resistant property occurs. In addition, in a case where a coating liquid to form a functional layer, including a functional layer-forming material, is used, and the coating liquid is applied to an antiglare layer in order to form a functional layer on an antiglare layer, a problem that a coating liquid is repelled may occur.

On the other hand, when, as an additive to be included in a coating liquid to form an antiglare layer as a surfactant, an acrylic additive is used instead of silicone system additives or fluorine system additives, there is not such a problem that the adhesive property between an antiglare layer and a functional layer when a functional layer is formed on a functional layer is lowered.

In a case where a functional layer such as a reflection preventing layer is provided on an antiglare layer and silicone system additives or fluorine system additives are used for a coating liquid to form an antiglare layer as a surfactant, there are such problems that the adhesive property between a functional layer and an antiglare layer is poor, and that a coating liquid is repelled when applying a coating liquid. On the other hand, in the present invention, when a functional layer is provided on an antiglare layer, an acrylic additive can be added to a coating liquid to form an antiglare layer as a surfactant. The use of an acrylic additive not only can prevent a defective coated film like repelling, bubble, unevenness, pinhole and crater from occurring in an antiglare layer to be formed, but also can solve such problems that the adhesive property between a functional layer and an antiglare layer is poor and that a functional layer is repelled, wherein those problems occur when silicone system additives or fluorine system additives are used.

Especially, it is desirable that a functional layer-forming material to be provided on an antiglare layer includes an ionizing radiation-curable material. That is, when a functional layer-forming coating liquid including an ionizing radiation-curable material is applied to an antiglare layer which is formed by curing an ionizing radiation-curable material as a binder matrix including an acrylic additive, and a functional layer is formed by curing a functional layer-forming coating liquid, high adhesive property between an antiglare layer and a functional layer to be provided on an antiglare layer can be achieved and an antiglare film having high abrasion resistant property can be obtained. Needless to say, such problem does not occur that a functional layer-forming coating liquid is repelled when a functional layer-forming coating liquid is applied to an antiglare layer.

At this time, an acrylic additive to be used as a surfactant has a basic structure which acrylic monomer, methacryl monomer or styrene monomer is polymerized. In addition, an acrylic additive may have a basic structure which acrylic monomer, methacryl monomer or styrene monomer is polymerized, including substituent groups such as an alkyl group, a poly ether group, a poly ester group, a hydroxyl group and an epoxide as a side-chain.

In addition, an antiglare layer-forming coating liquid to be used for the present invention can include other additives as well as the above-mentioned surfactant. However, it is desirable that these functional additives do not affect transparency, light diffuseness etc. of an antiglare layer. Examples of the usable functional additives include an antistatic agent, an ultraviolet absorber, an infrared absorber, a refraction index-adjusting agent, an antifouling agent, a water repellent agent, an adhesiveness-improving agent and a curing agent. An antiglare layer can have functions such as an antistatic function, an ultraviolet absorbing function, an infrared absorbing function, an antifouling function and a water repellent function besides an antiglare function.

A coated film is formed by applying a coating liquid for forming an antiglare layer to a transparent substrate.

A coating method using a roll coater, a reverse roll coater, a gravure coater, a knife coater, a bar coater or a die coater can be used as well as any well known methods in order to apply a coating liquid to a transparent substrate. Among them, a die coater which can apply a coating liquid at high speed by the roll to roll method is preferably used. The solid content concentration of the coating liquid differs depending on a coating method. The solid content concentration may be around 30-70 wt % in weight ratio.

Figure 4:
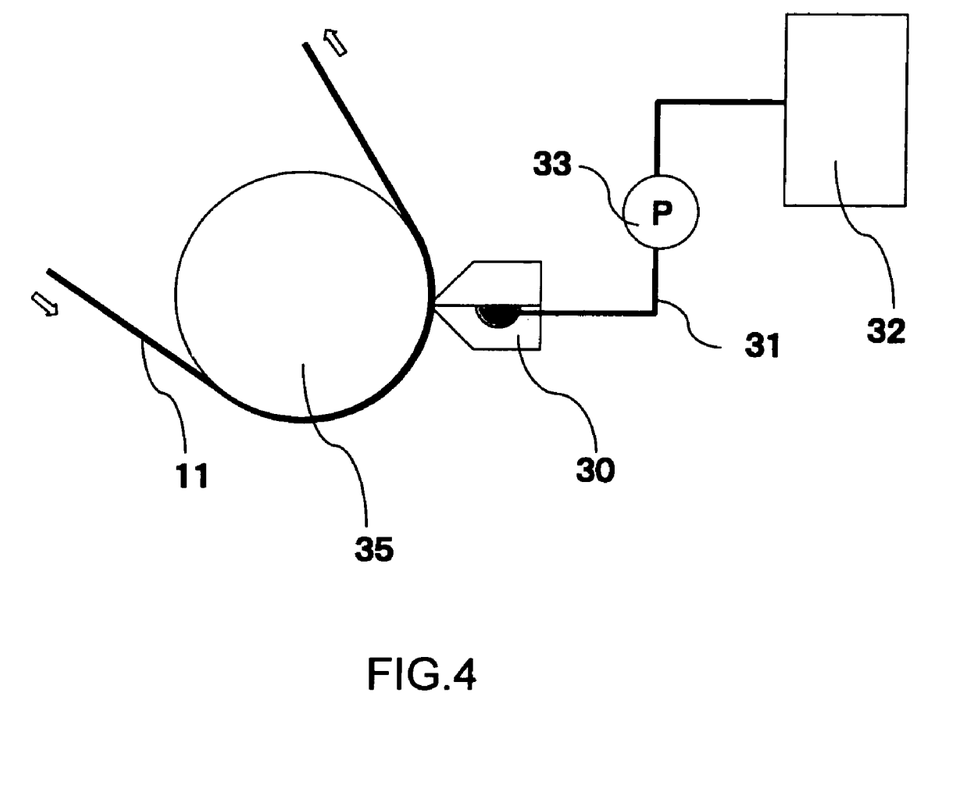
FIG. 4 is a view of a frame format of a die coater application apparatus.

Next, a die coater application apparatus used for the present invention is described below. FIG. 4 shows a view of a frame format of a die coater application apparatus. As for a die coater application apparatus used for the present invention, die head 30 is connected to tank 32 for a coating liquid by piping 31 and a coating liquid in tank 32 is sent to the inside of die head 30 by liquid supplying pump 33. A coating liquid sent to die head 30 is discharged from a slit of die head 30 and then a film is formed on transparent substrate 11. A film can be continuously formed on the transparent substrate by the roll to roll method by using a winding-type transparent substrate 11 and rotary roll 35.

An antiglare layer is formed by irradiating a film with ionizing radiation, wherein the film is formed by applying a coating liquid to a transparent substrate. Usable ionizing radiation includes ultraviolet rays, electron beams.

In the case of ultraviolet curing, a light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

At this time, a drying process for removing a solvent in a coating liquid may be provided before or after a curing process of an antiglare layer. In addition, curing and drying may be performed simultaneously. Especially, in a case where a coating liquid includes a binder matrix material, a particle and a solvent, it is necessary to provide a drying process in order to remove a solvent in a formed coated film before irradiating an ionizing radiation. That is, an antiglare layer is formed by the following processes: an applying process of applying an antiglare layer-forming coating liquid to a transparent substrate; a drying process of drying a coated film which is applied to a transparent substrate; and irradiating process of irradiating an ionizing radiation to a coated film on a transparent substrate, in this order. In addition, examples of drying means include heating, air blowing and hot air blowing.

In this way, an antiglare film of the present invention can be manufactured.

Next, as shown in FIG. 2, a method of forming a reflection preventing layer is described, wherein an antiglare film has a reflection preventing layer as a functional layer on an antiglare layer. Examples of reflection preventing layers include a single layer type consisting of a single layer of low refractive index and a laminated type where a low refractive index layer and a high refractive index layer are laminated repeatedly. In addition, examples of methods of forming a reflection preventing layer include a wet type film forming method where the layer is formed by applying a reflection preventing layer-forming coating liquid to a surface of an antiglare layer and a vacuum type film forming method such as a vacuum evaporation method and a sputtering method and a CVD method.

Hereinafter, a method of forming a reflection preventing layer is described where a single layer consisting of a low refractive index layer is formed by a wet type film forming method where a reflection preventing layer-forming coating liquid is applied to a surface of an antiglare layer. At this time, a film thickness (d) of a single layer consisting of a low refractive index layer is designed so that the optical thickness (nd) where the thickness (d) is multiplied by a refractive index (n) of a low refractive index layer is equal to ¼ of a wave length of a visible light. A low refractive index layer is, for example, a layer where a low refractive index particle is dispersed in a binder matrix.

At this time, examples of low refractive index particles include low refractive index particles comprised of low refractive index materials such as magnesium fluoride, calcium fluoride, silica or the like. On the other hand, as a binder matrix-forming material, polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid, which are the ionizing radiation-curable resins, can be used. In addition to these, a polyether resin having an acrylate-based functional group, polyester resin, epoxy resin, alkyd resin, spiroacetal resin, polybutadiene resin, polythiolpolyene resin can be also used as the ionizing radiation-curable resins. In a case where these ionizing radiation-curable resins are used, a binder matrix is formed by irradiating the resin with the ionizing radiation such as an ultra violet ray and an electron beam. In addition, as a binder matrix-forming material, metalalkoxide such as silicon alkoxide such as tetramethoxy silane or tetraethoxysilane can be used. These materials can become inorganic or organic-inorganic composite matrix by hydrolyzing and dehydration-condensing.

In addition, a low refractive index layer can be formed not only by using a binder matrix with dispersed low refractive particles, but also by using a fluorinated organic material of low refractive index without low refractive index particles.

In addition, it is desirable that a low refractive index forming material to be provided on an antiglare layer should include ionizing radiation-curable resins. That is, in a case where a low refractive index layer is formed by curing a coating liquid, including ionizing radiation-curable resins, to form a low refractive index layer on an antiglare layer to be formed by curing ionizing radiation-curable resins as a binder matrix, the adhesive property between an antiglare layer and a low refractive index layer can be strong and an antiglare film having high abrasion resistant property can be obtained.

These coating liquids to form a low refractive index layer, including a low refractive index material and a binder matrix-forming material, is applied to a surface of an antiglare layer. In this embodiment, a coating liquid to form a low refractive index layer can include a solvent or various additives as needed. A solvent is selected, while suitability for coating is considered, among aromatic hydrocarbons such as toluene, xylene, cyclohexane and cyclohexylbenzene, hydrocarbon such as n-hexane, ether such as dibutyl ether, dimethoxymethane, dimethoxyethane, diethoxyethane, propylene oxide, dioxan, dioxolane, trioxane, tetrahydrofuran, anisole and phenetole, ketones such as methyl isobutyl ketone, methyl butyl ketone, acetone, methyl ethyl ketone, diethyl ketone, dipropyl ketone, di-isobutyl ketone, cyclopentanone, cyclohexanone and methylcyclohexanone, Ester such as ethyl formate, propyl formate, formic acid n-pentyl, methyl acetate, ethyl acetate, methyl propionate, methyl propionate, acetic acid n-pentyl and γ-butyrolactone, cellosolve such as methyl cellosolve, cellosolve, butylcellosolve and cellosolve acetate, alcohols such as methanol, ethanol and isopropanol, and water. In addition, additives such as a surfactant, an antistatic agent, a refraction index-adjusting agent, an antifouling agent, a water repellent agent, an adhesiveness-improving agent and a curing agent can be added to the coating liquid.

A coating method using a roll coater, a reverse roll coater, a gravure coater, a knife coater, a bar coater or a die coater can be used.

In a case where a coated film is obtained by applying a coating liquid to a transparent substrate and an ionizing radiation-curable resin are used as a binder matrix-forming material, after a coated film is dried as needed, a reflection preventing layer is formed by irradiating a coated film with ionizing radiation. In addition, metal alkoxide is used as a binder matrix-forming material, and a reflection preventing layer is formed by drying and heating.

In addition, a reflection preventing layer can be a laminated structure where a low refractive index layer and a high refractive index layer are repeatedly laminated. For example, a reflection preventing layer can be obtained, wherein, from an antiglare side, titanium oxide as a high refractive index, silicon oxide as a low refractive index layer, titanium oxide as a high refractive index and silicon oxide as a low refractive index layer are layered in this order by the vacuum evaporation method.

In addition, in an antiglare film of the present invention, an antistatic layer is provided as a functional layer, and the following two methods can be used: a conductive material such as metal and metallic oxide is layered by the vacuum film formation method; and a coating liquid is applied, wherein, in a coating liquid, a conductive material such as a metal and metallic oxide is dispersed in a binder matrix.

An antiglare film having the above-mentioned structure can have the following features: good antiglare property; no white blur; high abrasion resistant property; less dazzling; and not whitened.

EXAMPLES

Hereinafter, examples are described.

Example 1

A triacetylcellulose film (TD-80U, manufactured by Fuji Photo Film Co., LTD.) was used as a transparent substrate. As a coating liquid, a coating liquid to form an antiglare layer, including a binder matrix-forming material, organic particles A, organic particles B and a solvent shown as AG coating liquid 1 in Table 1, was used. A coating liquid was applied to a triacetylcellulose film by a die coater so that an average film thickness of a dried and cured antiglare layer was 12 μm, thereby a coated film was obtained. A coated film was dried to remove a solvent therein, thereafter a coated film was cured through ultraviolet irradiation of 400 mJ/cm$^2$ using a high-pressure mercury lamp under an atmosphere of 0.03% or less of oxygen concentration to prepare an antiglare film having an antiglare layer on a transparent substrate.

In this embodiment, an average film thickness of an antiglare layer was measured by using an electronic micrometer (K351C, a product of Anritsu Company). In addition, the average particle diameters of both organic particles A and organic particles B were measured using a particle size distribution measuring apparatus of a light diffusing system (SALD-7000, manufactured by Shimadzu Corporation). In addition, the refractive indexes of organic particles A and organic particles B were measured by the Becke line-detecting method (immersion method).

Examples 2-11

Comparative Examples 1-14

In Examples 2-11 and Comparative Examples 1-14, AG coating liquids 2-25 were used. By the same method as Example 1 other than the kind of AG coating liquid, an antiglare layer was formed on a triacetylcellulose film so that an average film thickness of an antiglare layer was 12 μm.

In Tables 1-5, AG coating liquids 1-25 used in Examples 1-11 and Comparative Examples 1-14 are listed.

TABLE 1

|  |  | composition of a coating liquid | material | part by weight | average particle diameter (μm) | refractive index | average film thickness (μm) |
|---|---|---|---|---|---|---|---|
| Example 1 | AG coating liquid 1 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 10.0 | 7.8 | 1.49 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
| Example 2 | AG coating liquid 2 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle B | 10.0 | 7.8 | 1.5 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
| Comparative Example 1 | AG coating liquid 3 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle B | 10.0 | 7.8 | 1.51 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
| Example 3 | AG coating liquid 4 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle B | 10.0 | 7.8 | 1.58 |  |
|  |  | organic particle B | particle B | 10.0 | 3.2 | 1.58 |  |
|  |  | solvent | solvent A | 30.0 |  |  |  |
|  |  |  | solvent B | 70.0 |  |  |  |
| Comparative Example 2 | AG coating liquid 5 | binder matrix-forming material | material A | 95.0 |  | 1.53 | 12 |
|  |  |  | material B | 5.0 |  |  |  |
|  |  |  | material C | 0.5 |  |  |  |
|  |  | organic particle A | particle C | 10.0 | 7.8 | 1.59 |  |
|  |  | organic particle B | particle C | 10.0 | 3.2 | 1.59 |  |
|  |  | solvent | solvent A | 30.0 |  |  |  |
|  |  |  | solvent B | 70.0 |  |  |  |

In the table, material A:pentaerythritol triacrylate, material B:Irgacure 184, material C:acrylic additive BYK-350 (manufactured by BYK-Chemie), particles A:PMMA particles, particles B:acryl styrene particles, particle C:styrene particles, solvent A:dioxolane, solvent B:toluene.

TABLE 2

|  |  | composition of a coating liquid | material | part by weight | average particle diameter (μm) | refractive index | average film thickness (μm) |
|---|---|---|---|---|---|---|---|
| Example 4 | AG coating liquid 6 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 15.0 | 7.8 | 1.49 |  |
|  |  | organic particle B | particle A | 10.0 | 1.6 | 1.49 |  |
|  |  | Solvent | solvent A | 30.0 |  |  |  |
|  |  |  | solvent B | 70.0 |  |  |  |
| Comparative Example 3 | AG coating liquid 7 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 15.0 | 7.8 | 1.49 |  |
|  |  | organic particle B | particle A | 10.0 | 1.4 | 1.49 |  |
|  |  | solvent | solvent A | 30.0 |  |  |  |
|  |  |  | solvent B | 70.0 |  |  |  |
| Example 5 | AG coating liquid 8 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 10.0 | 7.8 | 1.49 |  |
|  |  | organic particle B | particle A | 10.0 | 4.6 | 1.49 |  |
|  |  | solvent | solvent A | 30.0 |  |  |  |
|  |  |  | solvent B | 70.0 |  |  |  |

TABLE 2-continued

|  |  | composition of a coating liquid | material | part by weight | average particle diameter (μm) | refractive index | average film thickness (μm) |
|---|---|---|---|---|---|---|---|
| Comparative Example 4 | AG coating liquid 9 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 10.0 | 7.8 | 1.49 |  |
|  |  | organic particle B | particle A | 10.0 | 4.8 | 1.49 |  |
|  |  | solvent | solvent A | 30.0 |  |  |  |
|  |  |  | solvent B | 70.0 |  |  |  |
| Example 6 | AG coating liquid 10 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 13.0 | 7.8 | 1.49 |  |
|  |  | organic particle B | particle A | 13.0 | 3.2 | 1.49 |  |
|  |  | solvent | solvent A | 30.0 |  |  |  |
|  |  |  | solvent B | 70.0 |  |  |  |

TABLE 3

|  |  | composition of a coating liquid | material | part by weight | average particle diameter (μm) | refractive index | average film thickness (μm) |
|---|---|---|---|---|---|---|---|
| Comparative Example 5 | AG coating liquid 11 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 14.0 | 4.4 | 1.49 |  |
|  |  | organic particle B | particle A | 14.0 | 1.8 | 1.49 |  |
|  |  | solvent | solvent A | 30.0 |  |  |  |
|  |  |  | solvent B | 70.0 |  |  |  |
| Example 7 | AG coating liquid 12 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 9.0 | 9.4 | 1.49 |  |
|  |  | organic particle B | particle A | 9.0 | 3.9 | 1.49 |  |
|  |  | solvent | solvent A | 30.0 |  |  |  |
|  |  |  | solvent B | 70.0 |  |  |  |
| Comparative Example 6 | AG coating liquid 13 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 8.0 | 10.0 | 1.49 |  |
|  |  | organic particle B | particle A | 8.0 | 4.3 | 1.49 |  |
|  |  | solvent | solvent A | 30.0 |  |  |  |
|  |  |  | solvent B | 70.0 |  |  |  |
| Comparative Example 7 | AG coating liquid 14 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 10.0 | 12.0 | 1.49 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
| Example 8 | AG coating liquid 15 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 10.0 | 9.5 | 1.49 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |

TABLE 4

|  |  | composition of a coating liquid | material | part by weight | average particle diameter (μm) | refractive index | average film thickness (μm) |
|---|---|---|---|---|---|---|---|
| Example 9 | AG coating liquid 16 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 15.0 | 4.8 | 1.49 |  |

TABLE 4-continued

|  |  | composition of a coating liquid | material | part by weight | average particle diameter (μm) | refractive index | average film thickness (μm) |
|---|---|---|---|---|---|---|---|
|  |  | organic particle B | particle A | 10.0 | 2.5 | 1.49 |  |
|  |  | solvent | solvent A | 30.0 |  |  |  |
|  |  |  | solvent B | 70.0 |  |  |  |
| Comparative Example 8 | AG coating liquid 17 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 17.0 | 2.4 | 1.49 |  |
|  |  | organic particle B | particle A | 17.0 | 1.4 | 1.49 |  |
|  |  | solvent | solvent A | 30.0 |  |  |  |
|  |  |  | solvent B | 70.0 |  |  |  |
| Comparative Example 9 | AG coating liquid 18 | binder matrix-forming material | material A | 95.0 |  | 1.53 | 12 |
|  |  |  | material B | 5.0 |  |  |  |
|  |  |  | material C | 0.5 |  |  |  |
|  |  | organic particle A | particle A | 22.0 | 7.8 | 1.49 |  |
|  |  | organic particle B | particle A | 20.0 | 3.2 | 1.49 |  |
|  |  | solvent | solvent A | 30.0 |  |  |  |
|  |  |  | solvent B | 70.0 |  |  |  |
| Example 10 | AG coating liquid 19 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 20.0 | 7.8 | 1.49 |  |
|  |  | organic particle B | particle A | 20.0 | 3.2 | 1.49 |  |
|  |  | solvent | solvent A | 30.0 |  |  |  |
|  |  |  | solvent B | 70.0 |  |  |  |
| Example 11 | AG coating liquid 20 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 5.0 | 7.8 | 1.49 |  |
|  |  | organic particle B | particle A | 5.0 | 3.2 | 1.49 |  |
|  |  | solvent | solvent A | 30.0 |  |  |  |
|  |  |  | solvent B | 70.0 |  |  |  |

TABLE 5

|  |  | composition of a coating liquid | material | part by weight | average particle diameter (μm) | refractive index | average film thickness (μm) |
|---|---|---|---|---|---|---|---|
| Comparative Example 10 | AG coating liquid 21 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 4.0 | 7.8 | 1.49 |  |
|  |  | organic particle B | particle A | 5.0 | 3.2 | 1.49 |  |
|  |  | solvent | solvent A | 30.0 |  |  |  |
|  |  |  | solvent B | 70.0 |  |  |  |
| Comparative Example 11 | AG coating liquid 22 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle C | 10.0 | 7.8 | 1.59 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
| Comparative Example 12 | AG coating liquid 23 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle B | 10.0 | 7.8 | 1.52 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
| Comparative Example 13 | AG coating liquid 24 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 12.0 | 7.8 | 1.49 |  |
|  |  | organic particle B | particle A | 5.0 | 3.2 | 1.49 |  |
|  |  | solvent | solvent A | 30.0 |  |  |  |
|  |  |  | solvent B | 70.0 |  |  |  |
| Comparative Example 14 | AG coating liquid 25 | binder matrix-forming material | material A | 94.5 |  | 1.53 | 12 |
|  |  |  | material B | 5.0 |  |  |  |
|  |  |  | material C | 0.5 |  |  |  |
|  |  | organic particle A | particle A | 6.0 | 7.8 | 1.49 |  |

TABLE 5-continued

| composition of a coating liquid | material | part by weight | average particle diameter (μm) | refractive index | average film thickness (μm) |
|---|---|---|---|---|---|
| organic particle B | particle A | 10.0 | 3.2 | 1.49 | |
| solvent | solvent A | 30.0 | | | |
| | solvent B | 70.0 | | | |

Example 12

A coating liquid to form a low refractive index layer was applied on an antiglare layer of a sample manufactured in Example 1 so that a coated film after drying and curing was 100 nm. A coating liquid to form a low refractive index layer was LR coating liquid 1 shown in Table 6, comprising 20 part by weight of silica sol (refractive index 1.3, dispersed in ethanol, solid content 30 wt %), 15 part by weight of pentaerythritol triacrylate, 200 part by weight of isopropyl alcohol and 1 part by weight of Irgacure 184. A solvent was removed from a coated liquid by drying, thereafter a low refractive index layer was cured through ultraviolet irradiation of 400 mJ/cm$^2$ using a high-pressure mercury lamp under an atmosphere of 0.03% or less of oxygen concentration to prepare an antiglare film having a low refractive index layer, which was a reflection preventing layer as a functional layer, on an antiglare layer.

Example 13

AG coating liquid 26 shown in Table 6 was used. By the same method as Example 1 other than the kind of AG coating liquid, an antiglare layer was formed on a triacetylcellulose film so that an average film thickness of an antiglare layer was 12 μm. Next, by the same method as Example 12, a low refractive index layer having a 100 nm average film thickness, which was a reflection preventing layer as a functional layer, was formed, thereby an antiglare film was manufactured.

In Table 6, AG coating liquid 1, AG coating liquid 2 and LR coating liquid 1 used in Examples 12, 13 are listed.

TABLE 6

| | composition of a coating liquid | | material | part by weight | average particle diameter (μm) | refractive index | average film thickness (μm) |
|---|---|---|---|---|---|---|---|
| Example 12 | AG coating liquid 1 | binder | material A | 94.5 | | 1.53 | 12 |
| | | matrix-forming material | material B | 5.0 | | | |
| | | additive | material C | 0.5 | | | |
| | | organic particle A | particle A | 10.0 | 7.8 | 1.49 | |
| | | organic particle B | particle A | 10.0 | 3.2 | 1.49 | |
| | | solvent | solvent A | 30.0 | | | |
| | | | solvent B | 70.0 | | | |
| | LR coating liquid 1 | | silica sol (refractive index 1.3, dispersed in ethanol, solid content 30 wt %) | 20.0 | | | (100 nm) |
| | | | material A | 15.0 | | | |
| | | | Irgacure 184 | 1.0 | | | |
| | | | isopropyl alcohol | 200.0 | | | |
| Example 13 | AG coating liquid 26 | binder | material A | 94.5 | | 1.53 | 12 |
| | | matrix-forming material | material B | 5.0 | | | |
| | | additive | Fluorine system additive BYK-340 (manufactured by BYK-Chemie) | 0.5 | | | |
| | | organic particle A | particle A | 10.0 | 7.8 | 1.49 | |
| | | organic particle B | particle A | 10.0 | 3.2 | 1.49 | |
| | | solvent | solvent A | 30.0 | | | |
| | | | solvent B | 70.0 | | | |
| | LR coating liquid 1 | | silica sol (refractive index 1.3, dispersed in ethanol, solid content 30 wt %) | 20.0 | | | (100 nm) |
| | | | material A | 15.0 | | | |
| | | | Irgacure 184 | 1.0 | | | |
| | | | isopropyl alcohol | 200.0 | | | |

Example 14

AG coating liquid 27 shown in Table 7 was used. By the same method as Example 1 other than the kind of AG coating liquid, an antiglare layer was formed on a triacetylcellulose film so that an average film thickness of an antiglare layer was 12 μm. Next, by the same method as Example 12, a low refractive index layer having a 100 nm average film thickness, which was a reflection preventing layer as a functional layer, was formed, thereby an antiglare film was manufactured.

Example 15

A coating liquid to form a low refractive index layer was applied on an antiglare layer of a sample manufactured in Example 1 so that a coated film after drying and curing was 100 nm. A coating liquid to form a low refractive index layer was LR coating liquid 1 shown in Table 6, comprising 7 parts by weight of oligomer obtained by hydrolysis of tetraethoxysilane by hydrochloric acid of 1 mol/l (solid content 3.0 wt %), 3 parts by weight of silica particles (porous particles, refractive index 1.2) and 190 parts by weight of isopropyl alcohol. An obtained coated film was heated at 120° C. for 1 min. to manufacture an antiglare film having a low refractive index layer which is a reflection preventing layer as a functional layer on an antiglare layer.

In Table 7, AG coating liquid 27, AG coating liquid 1, LR coating liquid 1 and LR coating liquid 2 are listed.

2. In a case where light from a fluorescent tube was reflected on an antiglare film, an antiglare film was discolored or not ("white blur");
3. In a case where a surface of an antiglare layer was rubbed, a rubbed mark or a scratch occurred or not ("abrasion resistant property");
4. In a display with an antiglare film, a phenomenon in which a displayed image glittered occurred or not ("dazzling"); and
5. An antiglare film was whitened or not ("whitened"). Hereinafter, the evaluation method is described in detail.

<Antiglare Property>

Respective antiglare films obtained in Examples and Comparative Examples were laminated to respective black plastic plates through an adhesive and, in that state, an image of the reflection of fluorescent light was evaluated visually. The judgment standard is shown below.

TABLE 7

|  |  | composition of a coating liquid | material | part by weight | average particle diameter (μm) | refractive index | average film thickness (μm) |
|---|---|---|---|---|---|---|---|
| Example 14 | AG coating liquid 27 | binder | material A | 94.5 |  | 1.53 | 12 |
|  |  | matrix-forming material | material B | 5.0 |  |  |  |
|  |  | additive | Fluorine system additive BYLK-345(manufactured by BYK-Chemie) | 0.5 |  |  |  |
|  |  | organic particle A | particle A | 10.0 | 3.2 | 1.49 |  |
|  |  | organic particle B | particle A | 10.0 | 7.8 | 1.49 |  |
|  |  | solvent | solvent A | 30.0 |  |  |  |
|  |  |  | solvent B | 70.0 |  |  |  |
|  | LR coating liquid 1 | silica sol(refractive index 1.3, dispersed in ethanol, solid content 30 wt %) | | 20.0 |  |  | (100 nm) |
|  |  |  | material A | 15.0 |  |  |  |
|  |  |  | Irgacure | 1.0 |  |  |  |
|  |  |  | isopropyl alcohol | 200.0 |  |  |  |
| Example 15 | AG coating liquid 1 | binder | material A | 94.5 |  | 1.53 | 12 |
|  |  | matrix-forming material | material B | 5.0 |  |  |  |
|  |  | additive | material C | 0.5 |  |  |  |
|  |  | organic particle A | particle A | 10.0 | 7.8 | 1.49 |  |
|  |  | organic particle B | particle A | 10.0 | 3.2 | 1.49 |  |
|  |  | solvent | solvent A | 30.0 |  |  |  |
|  |  |  | solvent B | 70.0 |  |  |  |
|  | LR coating liquid 2 | oligomer obtained by hydrolysis of tetraethoxysilane by hydrochloric acid of 1 mol/l (solid content 3.0 wt %) | | 7.0 |  |  | (100 nm) |
|  |  | silica particle(porous particle, refractive index 1.2) | | 15.0 |  |  |  |
|  |  | isopropyl alcohol | | 190.0 |  |  |  |

Antiglare films obtained in Example 1-15 and Comparative Example 1-14 were evaluated as follows by the method described below:

1. In a case where external light was reflected on an antiglare film, an image obtained by an external light was unclear or not ("antiglare property");

⊚: image of reflection of fluorescent light is not noticeable at all.
○: image of reflection of fluorescent light is recognized a little, however the reflection is within permitted level.
x: image of reflection of fluorescent light is clear and the reflection is noticeable.

<White Blur>

Respective antiglare films obtained in Examples and Comparative Examples were laminated to respective black plastic plates using adhesive and fluorescent light was reflected in respective samples. In that state, the level of light diffusing in the respective samples was evaluated visually. The judgment standard is shown below.

○: the level of light diffusing is low, and white blur in an antiglare film is not noticeable.

x: white blur is noticeable, and is beyond the accepted range.

<Abrasion Resistant Property>

A surface of an antiglare layer of an antiglare film obtained in Examples and Comparative Examples were scrubbed with a steel wool (#0000) wherein the steel wool was reciprocated 10 times and the steel wool was under 500 g/cm² load. An outer appearance change such as a scratch on a surface of an antiglare layer was evaluated visually.

◎: An outer appearance change is not recognized at all.

○: An outer appearance change is recognized a little and the outer appearance change is not outstanding.

x: An outer appearance change is noticeable.

<Dazzling>

A glass substrate with a black matrix (BM) of 80-200 ppi pattern was placed on a light table incorporating fluorescent light tubes and a glass substrate with an antiglare film was placed on the glass substrate with the black matrix. In this state, the dazzling of an antiglare layer was evaluated visually. In this evaluation, the biggest value of the resolutions of BM where dazzling was not noticeable was determined to be the corresponding resolution.

○: the corresponding resolution is equal to or bigger than 150 ppi.

x: the corresponding resolution is equal to or less than 150 ppi.

<Whitening>

Respective antiglare films obtained in Examples and Comparative Examples were laminated to respective black plastic plates and, in that state, without external light reflection, the white level of an antiglare film was evaluated visually. The judgment standard is shown below.

○: whitening is not recognized.

x: Whitening is recognized and noticeable.

Table 8 shows the evaluation results of antiglare films about "antiglare property", "white blur", "abrasion resistant property", "dazzling" and "whitening"

TABLE 8

|  | (a) | (b) | (c) | (d) | (e1) | (e2) | (f) | Antiglare property | White blur | Abrasion resistant property | dazzling | whitening |
|---|---|---|---|---|---|---|---|---|---|---|---|---|
| Example 1 | 0.65 | 0.41 | 0.20 | 1.00 | 0.04 | 0.04 | 0.00 | ○ | ○ | ◎ | ○ | ○ |
| Example 2 | 0.65 | 0.41 | 0.20 | 1.00 | 0.03 | 0.04 | 0.01 | ○ | ○ | ◎ | ○ | ○ |
| Comparative Example 1 | 0.65 | 0.41 | 0.20 | 1.00 | 0.02 | 0.04 | 0.02 | ○ | ○ | ◎ | X | ○ |
| Example 3 | 0.65 | 0.41 | 0.20 | 1.00 | 0.05 | 0.05 | 0.00 | ○ | ○ | ◎ | ○ | ○ |
| Comparative Example 2 | 0.65 | 0.41 | 0.20 | 1.00 | 0.06 | 0.06 | 0.00 | ○ | ○ | ◎ | ○ | X |
| Example 4 | 0.65 | 0.21 | 0.25 | 0.67 | 0.04 | 0.04 | 0.00 | ○ | ○ | ◎ | ○ | ○ |
| Comparative Example 3 | 0.65 | 0.18 | 0.25 | 0.67 | 0.04 | 0.04 | 0.00 | ○ | X | X | ○ | ○ |
| Example 5 | 0.65 | 0.59 | 0.20 | 1.00 | 0.04 | 0.04 | 0.00 | ○ | ○ | ◎ | ○ | ○ |
| Comparative Example 4 | 0.65 | 0.62 | 0.20 | 1.00 | 0.04 | 0.04 | 0.00 | ○ | X | X | ○ | ○ |
| Example 6 | 0.65 | 0.41 | 0.26 | 1.00 | 0.04 | 0.04 | 0.00 | ○ | ○ | ◎ | ○ | ○ |
| Comparative Example 5 | 0.37 | 0.41 | 0.28 | 1.00 | 0.04 | 0.04 | 0.00 | X | ○ | ◎ | ○ | ○ |
| Example 7 | 0.78 | 0.41 | 0.18 | 1.00 | 0.04 | 0.04 | 0.00 | ○ | ○ | ◎ | ○ | ○ |
| Comparative Example 6 | 0.83 | 0.43 | 0.16 | 1.00 | 0.04 | 0.04 | 0.00 | ○ | X | X | ○ | ○ |
| Comparative Example 7 | 1.00 | 0.27 | 0.20 | 1.00 | 0.04 | 0.04 | 0.00 | ○ | X | X | ○ | ○ |
| Example 8 | 0.79 | 0.34 | 0.20 | 1.00 | 0.04 | 0.04 | 0.00 | ○ | ○ | ○ | ○ | ○ |
| Example 9 | 0.40 | 0.52 | 0.25 | 0.67 | 0.04 | 0.04 | 0.00 | ○ | ○ | ○ | ○ | ○ |
| Comparative Example 8 | 0.20 | 0.58 | 0.34 | 1.00 | 0.04 | 0.04 | 0.00 | X | ○ | ◎ | ○ | ○ |
| Comparative Example 9 | 0.65 | 0.41 | 0.42 | 0.91 | 0.04 | 0.04 | 0.00 | ○ | X | X | ○ | ○ |
| Example 10 | 0.65 | 0.41 | 0.40 | 1.00 | 0.04 | 0.04 | 0.00 | ○ | ○ | ○ | ○ | ○ |
| Example 11 | 0.65 | 0.41 | 0.10 | 1.00 | 0.04 | 0.04 | 0.00 | ○ | ○ | ◎ | ○ | ○ |
| Comparative Example 10 | 0.65 | 0.41 | 0.09 | 1.25 | 0.04 | 0.04 | 0.00 | X | ○ | ◎ | ○ | ○ |
| Comparative Example 11 | 0.6 | 50.4 | 10.20 | 1.00 | 0.06 | 0.04 | 0.10 | ○ | ○ | ◎ | ○ | X |
| Comparative Example 12 | 0.65 | 0.41 | 0.20 | 1.00 | 0.01 | 0.04 | 0.03 | ○ | ○ | ◎ | X | ○ |
| Comparative Example 13 | 0.65 | 0.41 | 0.17 | 0.42 | 0.04 | 0.04 | 0.00 | ○ | X | X | ○ | ○ |
| Comparative Example 14 | 0.65 | 0.41 | 0.16 | 1.67 | 0.04 | 0.04 | 0.00 | ○ | X | X | ○ | ○ |
| Example 12 | 0.65 | 0.41 | 0.20 | 1.00 | 0.04 | 0.04 | 0.00 | ◎ | ○ | ◎ | ○ | ○ |
| Example 13 | 0.65 | 0.41 | 0.20 | 1.00 | 0.04 | 0.04 | 0.00 | ◎ | ○ | ○ | ○ | ○ |
| Example 14 | 0.65 | 0.41 | 0.20 | 1.00 | 0.04 | 0.04 | 0.00 | ◎ | ○ | ○ | ○ | ○ |
| Example 15 | 0.65 | 0.41 | 0.20 | 1.00 | 0.04 | 0.04 | 0.00 | ◎ | ○ | ○ | ○ | ○ |

In Table 8, (a), (b), (c), (d), (e1), (e2) and (f) are following value:
(a) a value ($R_A/H$) which an average particle diameter ($R_A$) of organic particles A is divided by an average film thickness (H) of an antiglare layer; (b) a value ($R_B/R_A$) which an average particle diameter ($R_B$) of organic particles B is divided by an average particle diameter ($R_A$) of organic particle A;
(c) a value (($W_A+W_B)/W_M$) which is the total content of content ($W_A$) of organic particles A and the content ($W_B$) of organic particles B in an antiglare layer divided by the content ($W_M$) of a binder matrix in an antiglare layer;
(d) a value ($W_B/W_A$) which is the content ($W_B$) of organic particles B in an antiglare layer divided by the content ($W_A$) of organic particles A in an antiglare layer;
(e1) the difference in refractive index ($|n_A-n_M|$) between the refractive index ($n_A$) of organic particles A and the refractive index ($n_M$) of a binder matrix;
(e2) the difference in refractive index ($|n_B-n_M|$) between the refractive index ($n_B$) of organic particles B and the refractive index ($n_M$) of a binder matrix; and
(f) the difference in refractive index ($|n_A-n_B|$) between the refractive index ($n_A$) of organic particle A and the refractive index ($n_B$) of organic particles B.

What is claimed is:

1. An antiglare film, comprising:
a transparent substrate; and
an antiglare layer on the transparent substrate, the layer including a binder matrix, organic particles (A) and organic particles (B) having an average particle diameter smaller than an average particle diameter of particles (A), organic particles (A) and organic particles (B) being dispersed in the binder matrix,
wherein a value ($R_A/H$), which is the average particle diameter ($R_A$) of organic particles (A) divided by the average film thickness (H) of the antiglare layer, is equal to or more than 0.40 and equal to or less than 0.80;
wherein a value ($R_B/R_A$), which is the average particle diameter ($R_B$) of organic particles (B) divided by the average particle diameter ($R_A$) of organic particles (A), is equal to or more than 0.20 and equal to or less than 0.60;
wherein a value (($W_A+W_B)/W_M$), which is the total of the content ($W_A$) of organic particles (A) and the content ($W_B$) of organic particles (B) in the antiglare layer divided by the content ($W_M$) of a binder matrix in an antiglare layer, is equal to or more than 0.10 and equal to or less than 0.40;
wherein a value ($W_B/W_A$), which is the content ($W_B$) of organic particles (B) in the antiglare layer divided by the content ($W_A$) of organic particles (A) in the antiglare layer, is equal to or more than 0.50 and equal to or less than 1.50;
wherein the difference in refractive index ($|n_A-n_M|$) between the refractive index ($n_A$) of organic particles (A) and the refractive index ($n_M$) of the binder matrix is equal to or more than 0.02 and equal to or less than 0.05, and the difference in refractive index ($|n_B-n_M|$) between the refractive index ($n_B$) of organic particles (B) and the refractive index ($n_M$) of the binder matrix is equal to or more than 0.02 and equal to or less than 0.05; and
wherein the difference in refractive index ($|n_A-n_B|$) between the refractive index ($n_A$) of organic particles (A) and the refractive index ($n_B$) of organic particles (B) is equal to or less than 0.01.

2. The antiglare film according to claim 1, wherein a functional layer is formed on a surface of the antiglare layer, wherein the transparent substrate is formed on another surface of the antiglare layer, and
wherein the antiglare layer includes an acrylic additive.

3. A transmission type liquid crystal display, comprising:
the antiglare film according to claim 1;
a first polarizing plate;
a liquid crystal cell;
a second polarizing plate;
a backlight unit,
and arranged in that order from said antiglare film, said first polarizing plate, said liquid crystal cell, said second polarizing plate and said backlight unit.

* * * * *